United States Patent
Ambrosio et al.

(10) Patent No.: US 7,830,117 B2
(45) Date of Patent: Nov. 9, 2010

(54) VEHICLE CHARGING, MONITORING AND CONTROL SYSTEMS FOR ELECTRIC AND HYBRID ELECTRIC VEHICLES

(75) Inventors: Joseph Mario Ambrosio, Smithtown, NY (US); Konstantinos Sfakianos, Astoria, NY (US)

(73) Assignee: Odyne Systems, LLC, Waukesha, WI (US)

( * ) Notice: Subject to any disclaimer, the term of this patent is extended or adjusted under 35 U.S.C. 154(b) by 635 days.

(21) Appl. No.: 11/329,018

(22) Filed: Jan. 10, 2006

(65) Prior Publication Data

US 2006/0152189 A1 Jul. 13, 2006

Related U.S. Application Data

(60) Provisional application No. 60/642,501, filed on Jan. 10, 2005, provisional application No. 60/642,499, filed on Jan. 10, 2005.

(51) Int. Cl.
*H02J 7/00* (2006.01)
(52) U.S. Cl. ...................................... 320/109
(58) Field of Classification Search ................. 320/107, 320/109, 110, 116, 119, 120
See application file for complete search history.

(56) References Cited

U.S. PATENT DOCUMENTS

| | | | |
|---|---|---|---|
| 2,581,010 A | 1/1952 | Findley et al. | |
| 3,299,983 A | 1/1967 | Hubbard | |
| 3,923,115 A | 12/1975 | Helling | |
| 4,443,752 A | 4/1984 | Newman | |
| 4,918,690 A | 4/1990 | Markkula, Jr. et al. | |
| 4,941,143 A | 7/1990 | Twitty et al. | |
| 4,948,050 A | 8/1990 | Picot | |
| 4,955,018 A | 9/1990 | Twitty et al. | |
| 4,959,962 A | 10/1990 | Hagin et al. | |

(Continued)

FOREIGN PATENT DOCUMENTS

JP 09163616 A * 6/1997

(Continued)

OTHER PUBLICATIONS

U.S. Appl. No. 60/959,181, filed Jul. 12, 2007, Odyne Corporation.

(Continued)

*Primary Examiner*—Bao Q Vu
*Assistant Examiner*—Jue Zhang
(74) *Attorney, Agent, or Firm*—Foley & Lardner LLP

(57) ABSTRACT

A distributed charging system for electric and hybrid electric vehicles includes multiple battery packs of different voltages including high voltage battery packs and one or more low voltage battery packs, each having separate and independent charging systems and multiple sources of electric power. Electric power is distributed from the sources of electric power separately to each of the independent charging systems. A drive system for the electric or hybrid electric vehicle includes a stored energy system made up of these multiple battery packs and a master events controller controlling at least one of a) a traction drive system including a motor and controller for receiving driving electric energy from a stored energy system for propulsion of the vehicle, b), an auxiliary power system for recharging the battery packs and c) a vehicle monitoring and control network for controlling the operation of, and monitoring all bus systems in the vehicle.

27 Claims, 4 Drawing Sheets

U.S. PATENT DOCUMENTS

| | | | |
|---|---|---|---|
| 4,962,462 A * | 10/1990 | Fekete | 700/297 |
| 4,969,147 A | 11/1990 | Markkula, Jr. et al. | |
| 5,297,143 A | 3/1994 | Fridrich et al. | |
| 5,315,227 A * | 5/1994 | Pierson et al. | 320/101 |
| 5,319,641 A | 6/1994 | Fridrich et al. | |
| 5,366,827 A | 11/1994 | Belanger et al. | |
| 5,394,089 A | 2/1995 | Clegg | |
| 5,420,572 A | 5/1995 | Dolin, Jr. et al. | |
| 5,492,189 A | 2/1996 | Kriegler et al. | |
| 5,495,912 A | 3/1996 | Gray, Jr. et al. | |
| 5,500,852 A | 3/1996 | Riley | |
| 5,513,324 A | 4/1996 | Dolin, Jr. et al. | |
| 5,519,878 A | 5/1996 | Dolin, Jr. | |
| 5,568,037 A | 10/1996 | Massaroni et al. | |
| 5,569,552 A | 10/1996 | Rao et al. | |
| 5,620,057 A | 4/1997 | Klemen et al. | |
| 5,625,272 A * | 4/1997 | Takahashi | 320/116 |
| 5,635,805 A | 6/1997 | Ibaraki et al. | |
| 5,701,068 A * | 12/1997 | Baer et al. | 320/119 |
| 5,867,009 A * | 2/1999 | Kiuchi et al. | 322/16 |
| 5,923,093 A | 7/1999 | Tabata et al. | |
| 6,037,749 A | 3/2000 | Parsonage | |
| 6,048,288 A | 4/2000 | Tsujii et al. | |
| 6,220,733 B1 | 4/2001 | Gordon | |
| 6,251,042 B1 | 6/2001 | Peterson et al. | |
| 6,269,895 B1 | 8/2001 | Tanuguchi et al. | |
| 6,316,841 B1 | 11/2001 | Weber | |
| 6,395,417 B1 | 5/2002 | Frazier | |
| 6,456,041 B1 | 9/2002 | Terada et al. | |
| 6,484,830 B1 | 11/2002 | Gruenwald et al. | |
| 6,524,743 B2 | 2/2003 | Vackar | |
| 6,590,363 B2 * | 7/2003 | Teramoto | 320/101 |
| 6,598,496 B2 | 7/2003 | Pannell | |
| 6,617,826 B2 | 9/2003 | Liao et al. | |
| 6,651,759 B1 | 11/2003 | Gruenwald et al. | |
| 6,653,002 B1 | 11/2003 | Parise | |
| 6,666,022 B1 | 12/2003 | Yoshimatsu et al. | |
| 6,705,416 B1 | 3/2004 | Glonner et al. | |
| 6,708,787 B2 | 3/2004 | Naruse et al. | |
| 6,719,080 B1 | 4/2004 | Gray, Jr. | |
| 6,725,581 B2 | 4/2004 | Naruse et al. | |
| 6,880,651 B2 | 4/2005 | Loh et al. | |
| 6,882,129 B2 | 4/2005 | Boskovitch et al. | |
| 6,922,990 B2 | 8/2005 | Naruse et al. | |
| 6,945,893 B2 | 9/2005 | Grillo et al. | |
| 7,004,273 B1 | 2/2006 | Gruenwald et al. | |
| 7,104,920 B2 | 9/2006 | Beaty et al. | |
| 7,119,454 B1 | 10/2006 | Chiao | |
| 7,252,165 B1 | 8/2007 | Gruenwald et al. | |
| 7,273,122 B2 | 9/2007 | Rose | |
| 7,375,492 B2 | 5/2008 | Calhoon et al. | |
| 2001/0035740 A1 | 11/2001 | Palanisamy | |
| 2002/0028376 A1 | 3/2002 | Yamane et al. | |
| 2002/0108794 A1 | 8/2002 | Wakashiro et al. | |
| 2004/0108831 A1 | 6/2004 | Cartwright et al. | |
| 2005/0202315 A1 | 9/2005 | Sugeno et al. | |
| 2005/0271934 A1 | 12/2005 | Kiger et al. | |
| 2006/0116797 A1 | 6/2006 | Moran | |
| 2007/0124037 A1 | 5/2007 | Moran | |
| 2009/0018716 A1 | 1/2009 | Ambrosio | |
| 2009/0068547 A1 | 3/2009 | Ambrosio et al. | |
| 2009/0095549 A1 | 4/2009 | Dalum et al. | |
| 2009/0096424 A1 | 4/2009 | Ambrosio et al. | |

FOREIGN PATENT DOCUMENTS

| | | | |
|---|---|---|---|
| JP | 2001/008309 A | 1/2001 | |
| WO | WO 2009/009078 A1 | 1/2009 | |

OTHER PUBLICATIONS

AZD, Azure Dynamics, Electric Drive Solutions, AZD Force Drive, We drive a World of difference; available at least by May 30, 2008; 2 pgs.

AZD, Azure Dynamics, Force Drive Electric Solutions, Force Drive Electric Vehicles Zero Emissions, website: http://www.azuredynamics.com/products/force-drive/traction-motors.htm; © 2008 Azure Dynamics Inc.; accessed on Sep. 17, 2008; 2 pgs.

AZD, Azure Dynamics, LEEP, Low Emission Electric Power System, AZD has one of the largest hybrid technology engineering teams in the world; available at least by May 30, 2008; 2 pgs.

AZD, Azure Dynamics, Parallel Hybrid Electric Ford E450 Cutaway and Strip Chassis, available at least by May 30, 2008; 2 pgs.

AZD, Azure Dynamics, Series Hybrid Electric Azure CitiBus, Our drive can make your difference; available at least by May 30, 2008; 2 pgs.

Balance Hybrid Electric E450 Drive System Hybrid Trucks, © 2008 Azure Dynamics Inc.; website http://www.azuredynamics.com/products/balance-hybrid-electric.htm; accessed by Sep. 17, 2008; 2 pgs.

Blanco, S., "Odyne, Dueco will build PHV aerial lift truck," website: http://autobloggreen.com/2007/05/07/odyne-dueco-will-build-phev-aerial-lift-truck/, accessed on Jan. 3, 2009, 6 pgs.

Business Wire, Odyne Corp. Receives order for Twenty-five plug-in hybrid systems from Dueco, Inc., website: http://www.businesswire.com/portal/site/home/index.jsp?epi_menuItemID=887566059a3ae..., accessed on Jan. 3, 2008, 3 pgs.

CitiBus Hybrid Electric StarTrans, CitiBus HD Senator; © 2008 Azure Dynamics Inc.; website: http://www.azuredynamics.com/products/citibus-hybrid-electric.htm; accessed on Sep. 17, 2008; 2 pgs.

Dueco, Hybrid Vehicle, TL50M Dueco's Plug-In Hybrid Electric Vehicle (PHEV); available at least by May 30, 2008; website: www.dueco.com; 1 page.

Dueco/Odyne Corporation, Partners in Green Technology for the Utility Industry, Hybrid Power, PHEV-Diesel Electric; available at least by May 30, 2008; website: www.dueco.com; 1 page.

Eaton, Freightliner® LLC, Daimler Chrysler Truck Group, M2 "Proof of Concept" HEV Utility Truck Specs; available at least by May 30, 2008; 2 pgs.

Eaton, Hybrid Power Systems, Roadranger®, Eaton's Medium-Duty Hybrid Electric System provides up to 60% fuel savings and significantly reduces emissions as compared to a conventional drivetrain.*; © 2006 Eaton Corporation; website at www.roadranger.com.; 2 pgs.

Green Car Congress, "Nissan Adds Diesel Hybrid and CNG Models to Atlas H43 Lineup," website: http://www.greencarcongress.com/2007/09/nissan-adds-die.html; accessed on Jun. 23, 2009, 2 pgs.

Hodges, Susan L., Is There a Hybrid In Your Future?; website: http://www.lmtruck.com/articles/petemplate.aspx?storyid=116; accessed on Jun. 6, 2008; 6 pgs.

Hybrid Electric Vehicles LEEP Systems/Azure Dynamics; LEEP Systems/Freeze/Lift; © 2008 Azure Dynamics Inc.; website: http://www.azuredynamics.com/products/leep-system.htm; accessed on Sep. 17, 2008; 2 pgs.

HyPower by Terex, "Low Carbon Footprint, Plug-In Power Hybrid System," Copyright © 2009 Terex Corporation, 2 pgs.

International Search Report and Written Opinion for International Appl. No. PCT/US2008/079376, mail date Apr. 9, 2009, 9 pgs.

International Search Report and Written Opinion for International Appl. No. PCT/US08/08442, mail date Sep. 26, 2008, 7 pgs.

Isuzu, "Introduction of ELF Diesel Hybrid," website: http://www.isuzu.co.jp/world/technology/randd/project6/01.html; accessed on Nov. 1, 2007, 2 pgs.

Isuzu; "Low Pollution Alternative Fuel Vehicles," website: http://www.isuzu.co.jp/world/technology/low/index.html, accessed on Jun. 22, 2009, 3 pgs.

Ogando, Joseph; "Hydraulic Powertrains Propel These Hybrid Trucks," website: http://www.designnews.com/article/CA6451735.html?nid=2874#_self; Design News, Jun. 13, 2007; 5 pgs.

Palumbo, Anthony J.; Bloomfield, Aaron, Major, Jeff; Ultracapacitor Based "Hybrid Booster Drive®"; Original Aug. 2003 (Revised Jun. 2004); 16 pgs.

Powderly II, H.E., Long Island Business News, "Odyne to ship 25 plug-in systems to Dueco Inc.," dated Dec. 20, 2007, http://www.libn.com/breakingnews.htm?articleID=9497 accessed on Jan. 3, 2008, 2 pgs.

ThomasNet, "Aerial lift truck delivers plug-in hybrid functionality," website: http://news.thomasnet.com/fullstory/535299, accessed on Jan. 3, 2008, 4 pgs.

Vasilash, G., "Power Trains 2005, Hybrid Powertrains: The Two-Mode Approach," website: http://www.autofieldguide.com/articles/article_printl.cfm, accessed on Jun. 24, 2009, 3 pgs.

Vehicle Technology.org, Advanced GM Allison Two-Mode Parallel Hybrid Technology Ready for Europe; website: http://www.vehicletecnology.org/vt2007/36.html; accessed on Jun. 6, 2008; 2 pgs.

Vehicle Technology.org, Advanced GM Allison Two-Mode Parallel Hybrid Technology Ready for Europe; website: http://www.vehicletecnology.org/vt2007/37.html; accessed on Jun. 6, 2008; 2 pgs.

Vehicle Technology.org, Advanced GM Allison Two-Mode Parallel Hybrid Technology Ready for Europe; Energy storage system (ESS); website: http://www.vehicletecnology.org/vt2007/38.html; accessed on Jun. 22, 2009; 3 pgs.

* cited by examiner

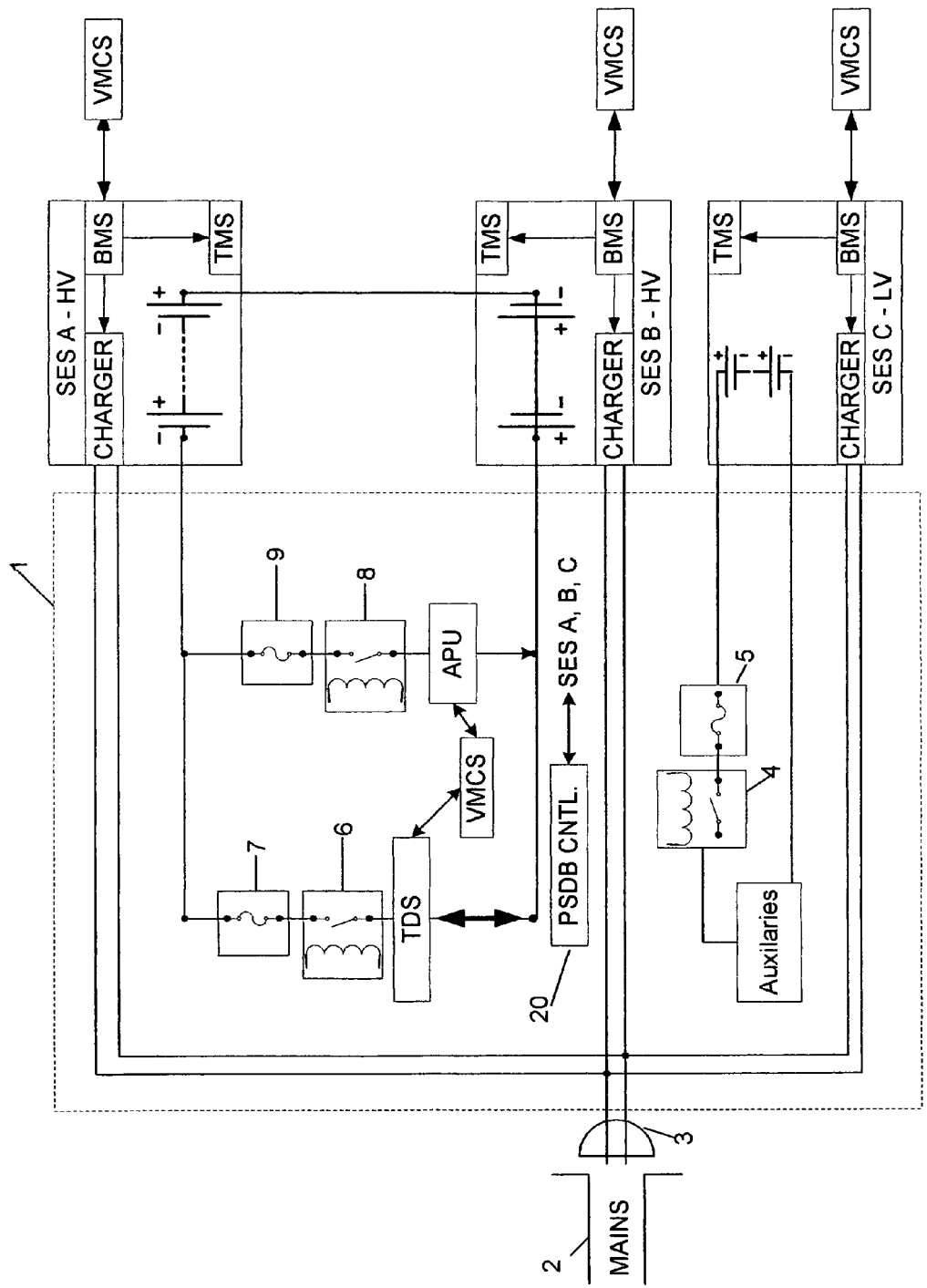
Figure 2A - SES in Series

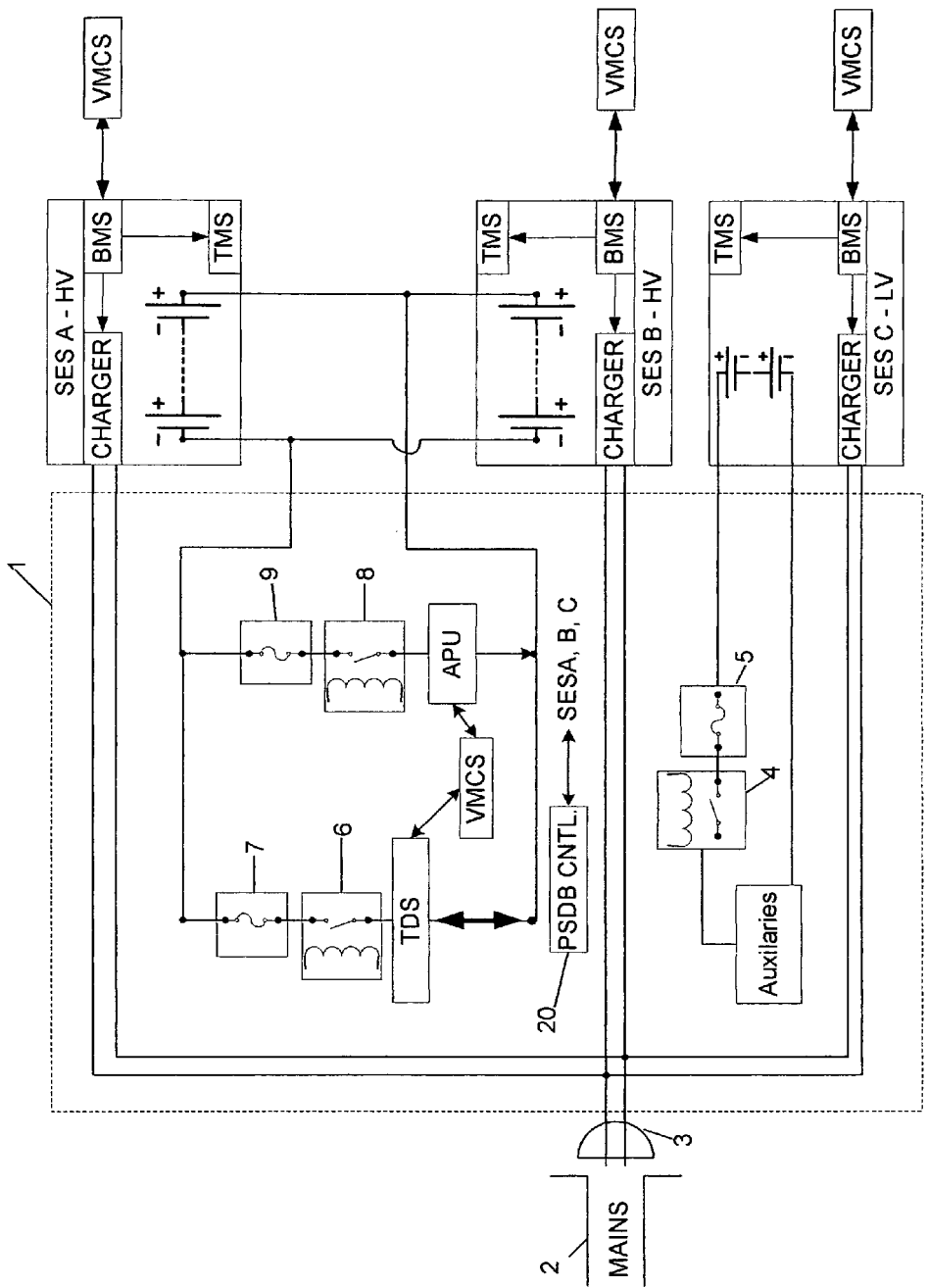
Figure 2B - SES in Parallel

VEHICLE CHARGING, MONITORING AND CONTROL SYSTEMS FOR ELECTRIC AND HYBRID ELECTRIC VEHICLES

CROSS REFERENCE TO RELATED APPLICATIONS

This application claims the benefit, under 35 U.S.C. 119(e) of U.S. Provisional Application No. 60/642,501, filed Jan. 10, 2005 and U.S. Provisional Application No. 60/642,499, filed Jan. 10, 2005, which are hereby incorporated by reference.

FIELD OF THE INVENTION

The present invention relates to energy distribution, monitoring and control systems for hybrid electric and electric motor vehicles. More particularly, the present invention is directed to electric and hybrid electric off-road and on-road vehicles, which use solely a battery pack or a battery and electric generator combination to supply energy for propulsion.

BACKGROUND OF THE INVENTION

Electric and hybrid electric vehicles sometimes require the use of a plurality of battery compartments in order to meet the total voltage and/or capacity requirements or to supply auxiliary systems requiring a separate battery compartment. For example, two battery strings or battery packs may be connected in a series configuration in order to double the voltage or in a parallel configuration in order to double the current capacity. In addition a vehicle sub-system may require a completely different voltage than that of the main vehicle battery voltage thus requiring a lower or higher voltage battery pack or string.

Recharging batteries configured in the stated, segmented configuration with a bulk-charging device is not optimal, resulting in uneven battery charging and premature battery failure.

OBJECTS OF THE INVENTION

It is an object of the present invention to address the distribution of energy to a plurality of battery charging equipment, which are found in a plurality of battery compartments (also called battery packs), in electric and hybrid electric vehicles. The battery compartments or battery packs are part of a Stored Energy System, which includes a plurality of batteries connected in series, a Battery Management System, a battery charger and a Battery Thermal Management System.

It is another object of the present invention to address a variety of control challenges associated with reliable and long-term battery operation of electric and hybrid electric motor vehicles. Vehicles utilizing the present invention include, but are not limited to, electric and hybrid electric buses, trucks, material handling vehicles (forklifts and pallet jacks), neighborhood electric vehicles, and airport support equipment.

It is another object of the present invention to monitor and control the systems of electric and hybrid electric vehicles having differing voltages for different subsystems of the vehicle.

It is yet another object of the present invention to provide a distributed battery charging system and to prevent uneven battery charging and premature battery failure in electric and hybrid electric vehicles.

It is also an object of the present invention to monitor vehicle subsystems of electric and hybrid electric vehicles.

Other objects which become apparent from the following description of the present invention.

SUMMARY OF THE INVENTION

The present invention is a distributed charging system, specifically placing a separate battery charger for each of the varying voltage battery compartments or Stored Energy Systems (SES), found on the vehicle. Another object of the invention is the distribution of the supply power to each of the chargers from the mains supply, which may be an AC or DC supply. The AC and DC power source can be generated onboard or off-board, or can be obtained from the local power grid.

An individual battery compartment housing a battery pack or a battery string is a Stored Energy System, which completely, includes a plurality of batteries individually connected in series and/or parallel creating the battery pack or string, a Battery Management System, a battery charger and a Battery Thermal Management System managing the temperature of one or more batteries or cells within a battery pack. A vehicle may have multiple SES units either connected in series or in parallel creating the main vehicle voltage and current capacity, or stand alone, powering a vehicle subsystem, which may require a lower or higher voltage and current capacity, different from the main vehicle voltage and current capacity to operate.

The Vehicle Monitoring and Control System (VMCS) of this invention is used to control the operation of, and monitor all the bus sub-systems found in electric and hybrid electric vehicles (EV/HEV's). This system has been designed to accommodate the challenges associated with the operation of a variety of energy storage and propulsion technologies found within EV/HEV's.

The major features of the system are:
"Plug and Play" capability
Modularity of components
Upgradeable as subsystem technologies change
Ethernet connectivity with embedded user interface software
Unique software algorithms for overall system control, miles to empty indication (indicating how much remaining distance in travel miles is related to fuel capacity before the fuel tank is empty of fuel)
Control strategies are based on individual battery module voltages The system includes a central controller called the Master Events Controller (MEC) and three major subsystems: 1) Traction Drive System, 2) Stored Energy System, and, 3) Auxiliary Power Unit (APU). The VMCS may service one or more Stored Energy Systems, which can be connected in parallel or in series with each other or stand-alone. The network operates on a Controller Area Network-based (CAN) system using a higher-level protocol such as Odyne Corporation's O-NET™, over which the major subsystems communicate with the Master Events Controller (MEC).

Master Events Controller (MEC):

The MEC is the central control unit of the system. All of the overall operation software of the vehicle resides within the MEC. The MEC has two modes of operation: 1) driving mode and 2) stationary mode. During each mode, the MEC executes specific commands to interface with each sub-system, the driver, or off-board systems (when parked for charging).

The systems controlled by the Master Events Controller (MEC) include one or more of the following systems:

Stored Energy System (SES)

An SES preferably includes the batteries (which can be of any chemistry or type), battery enclosure/tray, thermal management system, battery charger and microprocessor-based Battery Management System (BMS). The BMS monitors the batteries, controls the charger and thermal management system and communicates via CAN with the MEC. The BMS reports critical information to the MEC on overall battery pack and individual battery modules. The BMS also performs its own "internal" operations such as battery monitoring, equalization and charging. The BMS provides the MEC with battery state of charge information, so that the MEC can provide the operator with a "miles to empty" indication and with any critical errors which may exist within the its SES. Multiple SES units of different voltages and current capacities can be used on a vehicle, either connected in series, parallel or stand-alone.

Traction Drive System (TDS)

The Traction Drive System (TDS) preferably includes the traction motor, motor controller with Inverter and a Driver Interface Node (DIN). The TDS is the part of the system, which creates the path between the driver and the wheels, specifically processing accelerator and brake pedal feedback, in order to move and stop the vehicle. The TDS receives critical information from the Master Events Controller (MEC), (as provided by the Stored Energy System (SES) units and other vehicle sub-systems connected to the VMCS), in order to maximize available acceleration and allowable regenerative braking, based on the condition of the SES units.

Auxiliary Power Unit (APU)

The Auxiliary Power Unit (APU) preferably includes a heat engine, alternator, fuel storage and power conversion electronics. The APU system can be configured to operate on a variety of fuels and generates electricity to charge the battery packs within the SES units. Alternatively, a fuel cell can be used. The MEC sends commands to the APU through the APU Control Node in order to establish the correct time and power level for APU operation. The APU provides the MEC with critical information such as current engine operating statistics along with fuel level so the MEC can provide the driver with a "miles to empty" indication and with any errors which may exist within the APU.

BRIEF DESCRIPTION OF THE DRAWINGS

The present invention can best be understood in connection with the accompanying drawings. It is noted that the invention is not limited to the precise embodiments shown in drawings, in which:

FIGS. 2A and 2B are more detailed block diagrams of the charging system of FIG. 1 showing interfaces to a Stored Energy Systems (SES) which is part of the Vehicle Monitoring and Control System (VMCS) of this invention.

DETAILED DESCRIPTION OF THE EMBODIMENTS

Figure 1:
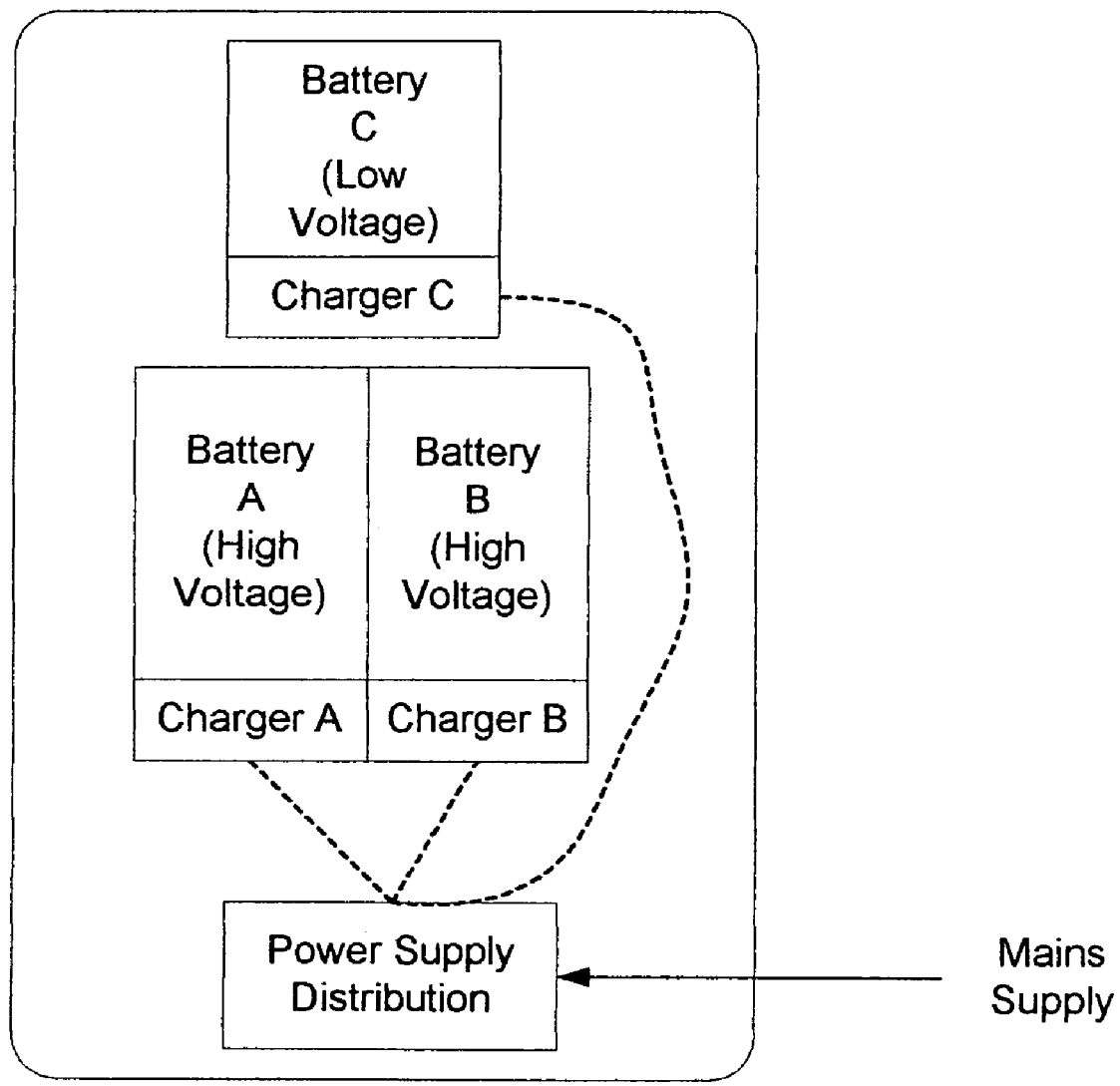
FIG. 1 is a block diagram showing the distributed charging system of this invention with a common power supply distribution block cabled to separate battery chargers incorporated into three separate battery packs on-board a vehicle.

FIG. 1 is an illustration showing an example of the distributed charging system of this invention. The illustration of FIG. 1 shows three battery packs A, B and C having different nominal voltages. Battery compartment A and battery compartment B are normally connected in series during vehicle operation in order to achieve a voltage double the rated voltage of each individual battery compartment. Battery compartment C is a low voltage battery pack, which is used to supply power to the vehicle auxiliaries.

Each battery compartment in FIG. 1 is a complete Stored Energy System (SES), complete with Battery Management System (BMS) and other control, measurement and communication blocks, such as a Thermal Management System (TMS) and battery charger. During the period when the vehicle is charged, each Stored Energy System (SES) charges its own batteries by using its own charger, which is controlled by its own BMS. Battery charger A, charges batteries in Stored Energy System (SES) A, battery charger B charges the batteries in Stored Energy System (SES) B and battery charger C charges batteries in Stored Energy System (SES) C; all independent and having a separate and distinct mains supply.

FIGS. 2A and 2B are more detailed block diagrams of a vehicle distributed charging system as in FIG. 1; FIG. 2A illustrates two high voltage Stored Energy Systems (SES's) in series, while FIG. 2B shows them in parallel. Both FIGS. 2A and 2B show routing of power to the battery chargers through a single power supply distribution block 1. Although this is illustrated as a two-wire AC or DC power distribution network, the power can be distributed via a common output to the distributed chargers as 3-wire or 4-wire three phase AC. Three complete Stored Energy Systems (SES) are illustrated in FIGS. 2A and 2B for the electric vehicle shown, however as few as one, or more than three such battery packs may be configured in any given vehicle.

FIGS. 2A and 2B also show that each of the chargers within its given SES is controlled by its associated battery management system (BMS) which, in turn, communicates with the VMCS. Each of the SES units has its own Thermal Management System (TMS), which is also controlled by the BMS.

FIGS. 2A and 2B also show that distribution block 1 has a control block 20 which communicates with the each of the Stored Energy Systems (SES) and controls the switching elements, while monitoring and controlling overload components. The mains power supply 2 is connected via connector 3 and provides power to the chargers individually. Switching elements 4, 6 and 8 are illustrated as electromagnetic relays; they may be solid-state relays instead. Overload elements 5, 7 and 9 are illustrated as fuses for clarity. Note that switching elements can be solid-state, and may range from steering diodes to IGPT's (isolated gate power transistors), MOSFET's or other AC or DC switching components. The overload elements can be circuit breakers, and not just fuses shown in FIGS. 2A and 2B.

Other elements shown in FIGS. 2A and 2B are the Auxiliary Power Unit (APU), shown connected via relay 8 and fuse 9, and Traction Drive System (TDS), shown connected via relay 6 and fuse 7. Auxiliaries include such items as lights, radio, power windows, HVAC systems, power seats, and many more. They are shown connected to a low voltage Stored Energy System (SES) C through relay 4 and fuse 5.

Figure 3:
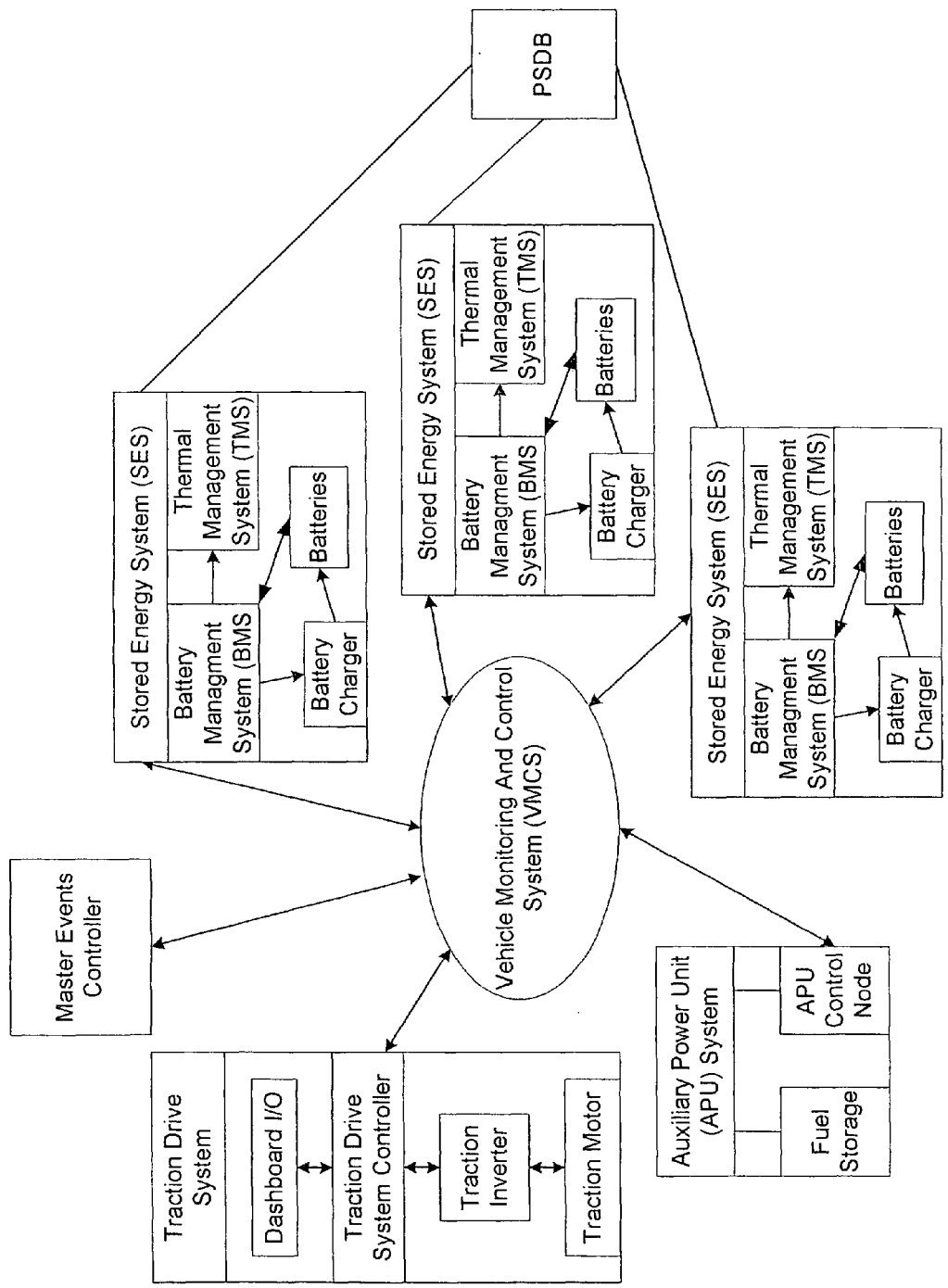
FIG. 3 is a block diagram of the Vehicle Monitoring and Control System (VMCS) of this invention, showing the main vehicle-based communications loop with sub-branches within the various vehicle subsystems.

FIG. 3 shows the Vehicle Monitoring and Control System of this invention. Although other isolated expandable bus types and protocols can be used as the vehicle communications network, the Controller Area Network, or CAN, is illustrated in FIG. 3. One of the attributes of this network is the "plug and play" feature, where the network uses a self-discovery procedure which identifies a newly "plugged-in" element and then establishes communications with it. The network is configured as a main loop establishing bi-directional communications between the Master Events Controller (MEC), and at least one of the Stored Energy Systems (SES), the Traction Drive System (TDS) and the Auxiliary Power Unit (APU).

In addition, in FIG. 3, the Auxiliary Power Unit (APU) has a direct link to the Fuel Storage unit; the Traction Drive System has two direct links (or a local loop) to each of the Dashboard I/O Interface and the Traction Motor and Controller element, and each Stored Energy System (SES) has a local loop or a local star network to communicate to its local Battery Management System (BMS) and Thermal Management System (TMS). Each Stored Energy System (SES) also communicate with the Power Supply Distribution Block (PSDB).

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A distributed charging system for electric and hybrid electric vehicles, the distributed charging system comprising:
   multiple battery packs;
   said battery packs having separate and independent charging systems and separate and independent battery management systems, the battery management systems controlling their respective independent charging systems;
   multiple sources of electric power for said independent charging systems; and
   means for distributing said electric power from said sources of electric power separately to each of said independent charging systems, wherein each battery management system is in communication with a vehicle monitoring control system, and wherein each battery pack has a separate and independent thermal management system controlled by its respective battery management system.

2. The distributed charging system of claim 1 wherein said battery packs are of different voltages.

3. The distributed charging system of claim 2 wherein said battery packs are high voltage battery packs.

4. The distributed charging system as in claim 1 further comprising at least one low voltage power pack.

5. The distributed charging system of claim 1 wherein the battery packs are high voltage battery packs connected in series during motor vehicle operation.

6. The distributed charging system as in claim 1 wherein the battery packs are connected in parallel during motor vehicle operation.

7. The distributed charging system of claim 1 wherein at least one of said sources of electric power is an onboard auxiliary power unit comprising an internal combustion engine.

8. The distributed charging system of claim 1 wherein at least one of said sources of electric power is an off-board power supply.

9. The distributed charging system of claim 1 wherein at least one of said sources of electric power is an AC power supply.

10. The distributed charging system of claim 1 wherein at least one of said sources of electric power is a DC power supply.

11. The distributed charging system of claim 1 wherein power is supplied to each of said battery packs from a mains supply.

12. The distributed charging system of claim 1 wherein one of said sources is solar energy.

13. The distributed charging system of claim 1 wherein all said sources of electric power are integrated into a single power supply distribution block.

14. The distributed charging system of claim 1 wherein each said battery pack of a battery compartment has associated therewith at least one sub-system requiring a different voltage than that of a main battery voltage for said battery pack, thereby requiring at least one of a lower and/or higher voltage battery compartment for said battery compartment.

15. A distributed charging system for a plurality of battery packs for vehicles, the distributed charging system comprising:
   a separate and independent charging system for each battery pack of the battery packs;
   a separate and independent battery management system for each battery pack of the battery packs, wherein the battery management system controls a respective independent charging system; and
   an independent thermal management system for each battery pack controlled by its respective battery management system, wherein each battery management system is in communication with a vehicle monitoring control system.

16. The distributed charging system as in claim 15 further comprising at least one low voltage power pack.

17. The distributed charging system of claim 15 wherein said battery packs are high voltage battery packs.

18. The distributed charging system of claim 15 wherein the high voltage battery packs are connected in series during motor vehicle operation.

19. The distributed charging system as in claim 15 wherein the battery packs are connected in parallel during motor vehicle operation.

20. The distributed charging system of claim 15 wherein at least one of said sources of electric power is an onboard auxiliary power unit comprising an internal combustion engine.

21. The distributed charging system of claim 15 wherein at least one of said sources of electric power is an off-board power supply.

22. The distributed charging system of claim 15 in which at least one of said sources of electric power is an AC power supply.

23. A distributed charging system for vehicles, the distributed charging system comprising:
   a plurality of battery packs, the battery packs having separate and independent charging systems, separate and independent battery management systems, and separate and independent thermal management system, wherein each of the battery management systems controls a respective charging system of the independent charging systems and a respective thermal management system of the thermal management systems and wherein each battery management system is in communication with a vehicle monitoring control system.

24. The distributed charging system of claim 23 wherein the battery packs are configured as a stored energy system.

25. The distributed charging system of claim 24 further comprising an input of receiving power from an APU and mains.

26. The distributed charging system of claim 15 wherein the thermal management system, and the battery management system are coupled to a local star network.

27. The distributed charging system of claim 15, wherein the battery packs are coupled to multiple power sources in series or in parallel.

* * * * *